United States Patent [19]  
G'Geppert

[11] Patent Number: 4,752,167  
[45] Date of Patent: Jun. 21, 1988

[54] VEHICLE TRANSPORT DEVICE

[75] Inventor: Erwin G'Geppert, Novi, Mich.

[73] Assignee: The United States of America as represented by the Secretary of the Army, Washington, D.C.

[21] Appl. No.: 82,881

[22] Filed: Aug. 5, 1987

[51] Int. Cl.⁴ .............................................. B60P 3/07
[52] U.S. Cl. ........................................ 410/3; 410/56; 410/66
[58] Field of Search ................ 238/10 R; 410/3, 4, 410/7, 19, 47, 48, 52, 56, 58, 66, 67, 69

[56] References Cited

U.S. PATENT DOCUMENTS 1,833,979  12/1931  Swindle .......................... 137/234.6
3,308,845  3/1967  Bellas et al. ................... 137/234.6

Primary Examiner—Gerald A. Michalsky
Attorney, Agent, or Firm—Peter A. Taucher; Gail S. Soderling

[57] ABSTRACT

A load transport structure is disclosed, which distributes tire loads over a larger area. The structure has a ramp member which pivots so as to allow easy loading of a vehicle and pivots to a horizontal position to hold the load stable during transport.

2 Claims, 1 Drawing Sheet

FRONT                         REAR

VEHICLE TRANSPORT DEVICE

GOVERNMENT INTEREST

The invention described herein may be manufactured, used, and licensed by or for the Government for governmental purposes without payment to me of any royalty thereon.

BACKGROUND

In one aspect this invention relates to treadways used for loading and positioning, vehicles as cargo. In a further aspect this invention relates to devices used to position and hold vehicles when being transported.

A cargo transport when used to transport wheeled vehicles can be constructed with longitudinally extending treadways. When used in aircraft they are located and positioned within the aircraft to distribute vehicle weight and position the wheeled vehicle during transit. To load a vehicle within the cargo carrier; i.e., an airplane, a ramp, generally at the rear of the plane is lowered and the vehicle is driven onto the plane on ramps connected to the treadways. To ensure that the treadways maintain their integrity and prevent possible damage which might be caused by overloading, safety and cargo experts place an upper limit on the wheeled vehicle's weight. This restriction is necessary to ensure that the unit area loads applied to the treadway are below the level at which damage to the treadway occurs. The maximum weight can be expressed in terms of vehicle weight per tire or axle, i.e. 6500 pounds per wheel. In general, this wheel weight limitation effectively limits the maximum vehicle weight and many times the cargo weight caused by unit load restriction is below the maximum weight which the cargo carrier can effectively handle. Thus, the treadway load limit becomes the limiting factor on vehicle weight.

The wheel load problem can be particularly pronounced with construction equipment. Construction equipment is frequently weighted on one end so it is stable when used. This weighting can create very high wheel loads. In order to transport such vehicles the weighting must be removed prior to transport. Removing the weights or other ancillary equipment requires time, tools and personnel at both the departure and arrival points. This consumes valuable time and resources. Under battle conditions, the time is most important since the vehicle is being transported to perform a service immediately. The delay can severely hamper the effort and proponent availability of the vehicle at arrival is desirable.

It would be desirable to provide a transport device associated with the treadway which would spread the effective load over a broader area and give the wheeled vehicle a bigger "foot print" so that the treadway strength is not the limiting factor. It would also be desirable if the device provided helped position and hold the vehicle on the treadway during transit. The present invention also allows the transport of weighted vehicles without the necessity of removing the weights to lighten or balance the load.

BRIEF SUMMARY OF THE INVENTION

A vehicle transport device according to this invention has a base member rigidly mounted to the treadway or other supporting structure of the cargo transport. The base member is formed with an upright stud on one end of the base member. A first mounting boss is located near the middle of the base member's upper surface and extends upward.

A ramp member is located above the base member and has a second mounting boss extending from its lower surface towards the base member. The first and second mounting bosses are formed so they intermesh and are connected to rotate relative to each other. An axle extends transversely across the transport device through the mounting bosses to hold the base member and ramp member together at their respective bosses but allows the ramp to rotate between a first ramping position and a second storage position.

The upper surface of the ramp member can have a complimentary pair of retention brackets located on the upper surface of the ramp member in a position so when a pair of tandem wheels are located with the brackets between the wheels, a T-shaped retention bar can be inserted into the brackets to hold the vehicle stable on the ramp member.

DESCRIPTION OF PREFERRED EMBODIMENTS

Figure 1:
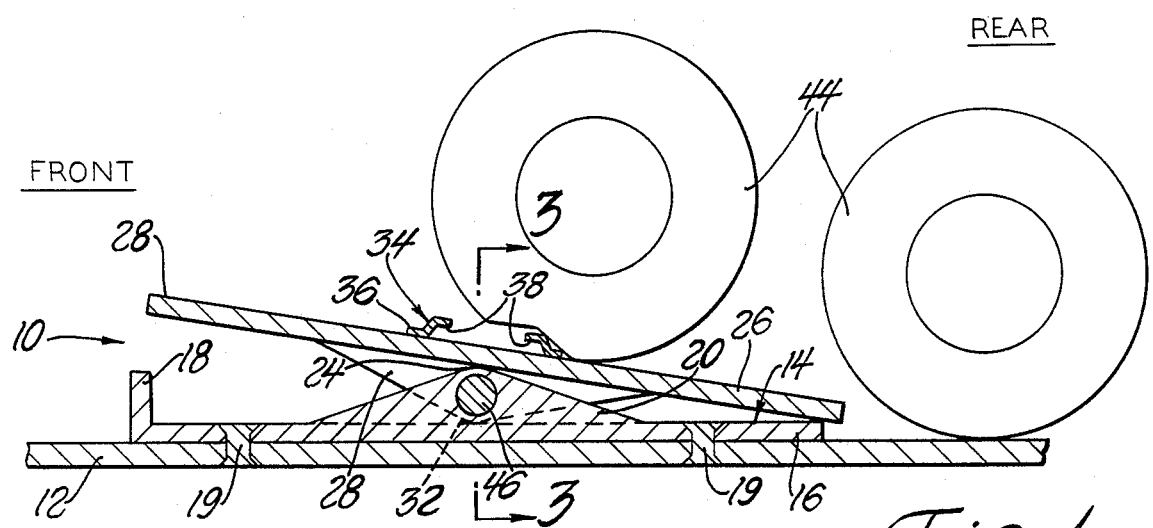
FIG. 1 is a side view in partial section of one embodiment of this invention showing a vehicle being loaded.

Referring to the accompanying drawing in which like numerals refer to like parts, a vehicle transport device is designated generally 10 and is mounted on a cargo transport's body designated 12. The transport device 10 has a base member 14 formed with a longitudinally extending base plate 16 and a vertically extending upright stud 18 formed at one end of the base plate. The base plate is shown rigidly fixed to the transport body 12 by means of rivets 19 which provide a permanent installation. If desired, the base plate 16 could be secured using threaded fasteners such as bolts which would make the system more easily removed and more adjustable.

As shown, the base plate 16 has a first mounting boss 20 located on its surface away from the cargo transport's body 12 and extending upward. The first mounting boss 20 has a plurality of individual fingers 22 which each have a bore, the axis of the bores being transverse to the transport device's longitudinal axis. The first mounting boss 20 has a rounded upper surface 24 which allows objects in contact with the first mounting bosses rounded upper surface 24 to rotate over the surface.

A ramp member 26 is made as a flat plate with a substantially flat upper surface 28 adapted to hold the vehicle to be transported. The ramp member 26 has a second mounting boss 28 located on the lower surface of the ramp member, the second mounting boss having a plurality of second fingers 30 which are complimentary to and interdigitated with the first fingers 22 of the first mounting boss 20. The second fingers 22 each have a bore with the axis of the bores being co-axially aligned with the bores of the first fingers. The second mounting boss also has a rounded surface 32 which allows the ramp member 26 to rock as a load passes over the ramp. The ramp member 26 has a pair of opposed brackets 34 located on its upper surface. The brackets 34 have a first leg 36 rigidly attached to the ramp and a raised leg 38 which is spaced from and parallel to the ramp's surface. The complimentary brackets 34 extend transversely across the ramp member 26 to form a channel which can hold a T-shaped retention bar 40. The bar 40 can be inserted into the brackets to hold a vehicle in place during transit and can be easily removed for unloading.

Figure 2:
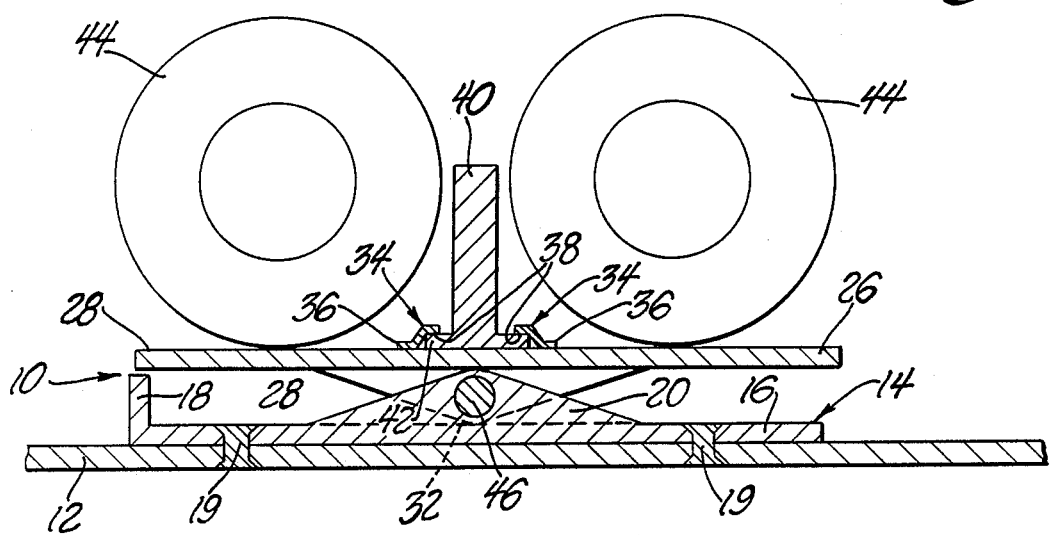
FIG. 2 is a side view of the device of FIG. 1 showing the vehicle in carrying position.
Figure 3:
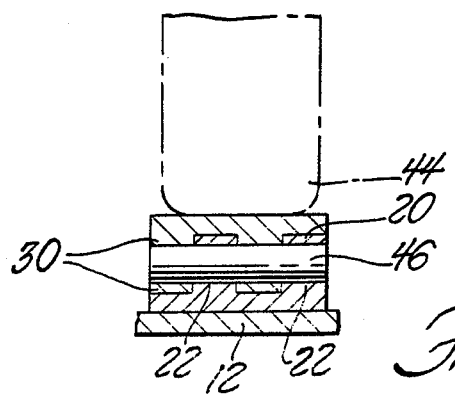
FIG. 3 is a transverse sectional view through the mounting boss; taken along the line 3—3 of FIG. 1.

As shown in FIG. 2 the retention bar 40 has been inserted with its cross arms 42 under the raised legs 38 so as to hold the T-shaped retention bar upright between the tandem wheels 44 of the vehicle (not shown) to be transported.

The operation of the transport device is shown by the sequence of FIGS. 1 and 2. In FIG. 1, the wheels 44 of a vehicle being loaded have approached the transport device 10 with the T-shaped retention member 40 removed. The ramp member 26 has tilted so that one end is in contact with the base member 14. As the vehicle moves on to the ramp member 26, it rotates about an axle 46 which passes through the bores of the bosses 20, 32. In the tilted or loading position, the wheels 44 can easily move on to the transport device 10. Once the vehicle is in the proper position as shown in FIG. 2, the ramp member 26 will have rotated about the axle 46 so that one end contacts the upright stud 18 and the ramp member is held in a generally horizontal position. The T-shaped retention bar 40 is then placed in the brackets 34 to limit the vehicle's movement once transport begins. The rotating feature of the transport device allows vehicles to be rapidly moved into and out of the carrier. Obviously additional tiedowns and other restraints can and will be used but the device of this invention distributes the vehicle's load over a much broader area on the treadway 12 so heavier vehicles or weighted vehicles can be transported.

The invention has been described with respect to a tandem wheeled vehicle. In many cases the vehicles don't normally have tandem wheels. However, a pair of auxiliary wheels could be attached to the vehicle near the permanent wheels to provide an in transit tandem configuration suitable for use with the device of this invention.

I wish it to be understood that I do not desire to be limited to the exact details of construction shown and described for obvious modifications will occur to a person skilled in the art, without departing from the spirit and scope of the appended claims.

I claim:

1. A vehicle transport device useful for positioning a vehicle in a cargo transport comprising; a base member rigidly affixed to the cargo transport, and a first mounting boss located near the midpoint of the base member, the first mounting boss extending upward from the base member; a ramp member located above the base member and having a second mounting boss extending downward towards the base member, the second mounting boss being adapted to intermesh with the first mounting boss, means associated with the base member to hold the ramp member in a horizontal position when loaded; an axle extending transversely across the transport device and through the bosses to hold the base member and ramp member together while allowing the ramp to rotate from a first slanted ramping position for positioning the vehicle to a second storage position for transporting the vehicle; a pair of opposed retention brackets located on the upper surface of the ramp member transversely across the ramp, and a retention bar adapted to fit between the retention brackets and having a portion which extends upwards towards the vehicle to block motion of the vehicle during transport.

2. A vehicle transport device useful for positioning a vehicle, having tandem wheels in a cargo transport comprising; a base member rigidly affixed to the cargo transport, the base member having an upright stud at one end and a first mounting boss located near the midpoint of the base member, the first mounting boss extending upward from the base member; a ramp member located above the base member and having a second mounting boss extending downward towards the base member, the second mounting boss being adapted to intermesh with the first mounting boss, and retention brackets formed on the and extending transversely across the upper surface of said ramp member; an axle extending transversely across the transport device and through the bosses to hold the base member and ramp member together while allowing the ramp to rotate from a first slanted ramping position for positioning the vehicle to a second storage position for transporting the vehicle; and a T-shaped retention bar having the cross arms located in and held by the retention bracket so the leg extends upward orthogonally from the ramp member between the tandem tires to hold the vehicle in position during transport.

* * * * *